US010704971B2

(12) United States Patent
Gilbert et al.

(10) Patent No.: US 10,704,971 B2
(45) Date of Patent: *Jul. 7, 2020

(54) SYSTEMS AND METHODS FOR USING CALIBRATION PROFILES IN VALVE ACTUATORS

(71) Applicant: TRI-TEC MANUFACTURING, LLC, Kent, WA (US)

(72) Inventors: Roy Gilbert, Redmond, WA (US); Richard Lynn Cordray, Redmond, WA (US)

(73) Assignee: TRI-TEC MANUFACTURING, LLC, Kent, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/115,451

(22) Filed: Aug. 28, 2018

(65) Prior Publication Data

US 2018/0364116 A1     Dec. 20, 2018

Related U.S. Application Data

(63) Continuation of application No. 14/620,958, filed on Feb. 12, 2015, now Pat. No. 10,082,432.

(51) Int. Cl.
| | | |
|---|---|---|
| *G01L 3/10* | (2006.01) | |
| *F16K 37/00* | (2006.01) | |
| *F16K 31/04* | (2006.01) | |

(52) U.S. Cl.
CPC .......... *G01L 3/109* (2013.01); *F16K 37/0083* (2013.01); *F16K 31/04* (2013.01); *F16K 31/046* (2013.01)

(58) Field of Classification Search
CPC . G01L 3/109; F16K 37/0083; F16K 37/0041; F16K 31/04; F16K 31/046
See application file for complete search history.

(56) References Cited

U.S. PATENT DOCUMENTS

| | | |
|---|---|---|
| 4,364,111 A | 12/1982 | Jocz |
| 4,542,649 A | 9/1985 | Charbonneau et al. |

(Continued)

FOREIGN PATENT DOCUMENTS

FR        2 779 227 A1     12/1999

OTHER PUBLICATIONS

Rockwell Automation | Allen-Bradley, "AC Motor Formula," 1996, 2 pages.

(Continued)

*Primary Examiner* — Jonathan M Dunlap
(74) *Attorney, Agent, or Firm* — Seed IP Law Group LLP

(57) ABSTRACT

Disclosed is a valve actuator configured to determine, during operation of a valve by an alternating current (AC) motor of the valve actuator, an amount of torque produced by the AC motor. A process for measuring the amount of torque produced by the AC motor includes actuating a valve using the AC motor of the valve actuator, measuring, by a microcontroller of the valve actuator and during the actuating of the valve, a time interval between: (i) a first zero crossing of a waveform of AC voltage applied to the AC motor, and (ii) a second zero crossing of a waveform of AC current drawn by the AC motor, and determining, based on the time interval, an amount of torque produced by the AC motor during the actuating.

20 Claims, 7 Drawing Sheets

(56) References Cited

U.S. PATENT DOCUMENTS

| | | | |
|---|---|---|---|
| 4,787,245 A | | 11/1988 | Anderson et al. |
| 4,869,102 A | | 9/1989 | Hale et al. |
| 4,896,101 A | | 1/1990 | Cobb |
| 5,095,710 A | * | 3/1992 | Black ............... A23G 9/045 |
| | | | 62/136 |
| 5,239,252 A | | 8/1993 | Runggaldier et al. |
| 5,937,373 A | * | 8/1999 | Ferrar ................. E03B 1/02 |
| | | | 702/113 |
| 6,051,952 A | * | 4/2000 | Moreira ............. H02P 25/04 |
| | | | 318/738 |
| 6,262,550 B1 | | 7/2001 | Kliman et al. |
| 7,950,294 B2 | | 5/2011 | Davidkovich et al. |
| 8,047,766 B2 | | 11/2011 | Goll |
| 8,096,523 B2 | | 1/2012 | Dolenti et al. |
| 8,342,478 B1 | | 1/2013 | Cordray et al. |
| 8,695,633 B2 | | 4/2014 | Nowak |
| 2002/0095986 A1 | * | 7/2002 | Ito ..................... G01M 13/02 |
| | | | 73/168 |
| 2003/0042861 A1 | | 3/2003 | Schwartz et al. |
| 2011/0169442 A1 | * | 7/2011 | Birumachi ............. H02P 8/34 |
| | | | 318/696 |
| 2011/0175006 A1 | | 7/2011 | Dolenti et al. |
| 2014/0103818 A1 | * | 4/2014 | Chen ................ H03K 17/133 |
| | | | 315/159 |

OTHER PUBLICATIONS

Toulson et al., "Embedded Systems Design Course, Applying the mbed microcontroller | Timers and interrupts," *ARM*, 2012, 20 pages.

* cited by examiner

SYSTEMS AND METHODS FOR USING CALIBRATION PROFILES IN VALVE ACTUATORS

BACKGROUND

Valve actuators are configured to operate valves that regulate or control the flow of a fluid through a passageway by opening, closing, or partially obstructing the passageway. A number of forces and pressures may act on the valve from the fluid in the passageway, and, depending on the environment in which a valve system is implemented, the amount of torque required to actuate the valve may be significant. In some environments, such as valves that are implemented in a seawater system (e.g., a marine vessel), a valve may get stuck when the valve is infrequently operated. For example, barnacles and other obstructions may form over time, which may affect how much torque is required to actuate the valve when it is necessary to do so. Thus, in many instances, it is useful to measure and monitor the torque applied to the valve at any given time during operation of the valve.

Automated valve actuators typically include an electric motor. Some valve actuators may include an electric motor in the form of a direct current (DC) motor(s). For DC motors, measuring torque is relatively simple. Since the current that is drawn by the DC motor may be taken as an indirect measurement of the torque being produced by the DC motor, a measurement of the current drawn by the DC motor may be used to derive the torque, and such a measurement is relatively easy to make.

However, many valve actuators, such as those that are implemented in marine environments like ocean liners and military ships, use one or more alternating current (AC) motors as the drive mechanism for operating the associated valve. For AC motors, one cannot simply measure the current drawn by the AC motor. For instance, as the torque applied by the AC motor increases, the absolute value of the AC current may not change significantly, possibly making it difficult to derive torque from a simple measurement of AC current.

To this end, various systems have been developed to measure torque applied to a valve by an AC motor. Some systems involve the use of mechanical-based sensors (e.g., strain gauges, brackets, etc.) that measure the torque applied to the valve based on output of the mechanical sensors. However, adding multiple mechanical-based sensors to a valve actuator can undesirably increase the weight and cost of the actuator. Electrical sensors have been developed to monitor torque produced by AC motors. However, conventional electrical sensors can be complex in design, making for a system that is relatively difficult and costly to manufacture.

BRIEF SUMMARY

Described herein are techniques and systems for determining an amount of torque produced by an alternating current (AC) motor used to operate a valve. The torque may be determined by measuring a time interval related to a phase shift between the waveform of the AC voltage applied to the AC motor and the waveform of the AC current drawn by the AC motor. The phase shift between the waveform of the AC voltage applied to the AC motor and the waveform of the AC current drawn by the AC motor can be correlated to the amount of torque produced by the AC motor of the valve actuator. Thus, various techniques and systems disclosed herein leverage a measurement of a time interval between the first zero crossing of the waveform of AC voltage applied to the AC motor and a second zero crossing of the waveform of AC current drawn by the AC motor. The time interval measurement may be used as an indicator of the phase shift between the two AC waveforms. Therefore, the measured time interval can be utilized to derive the amount of torque produced by the AC motor of the valve actuator.

In some embodiments, a process for measuring the amount of torque produced by the AC motor includes actuating a valve using the AC motor of the valve actuator, and measuring, using a microcontroller of the valve actuator and during the actuating of the valve, a time interval between: (i) a first zero crossing of a waveform of AC voltage applied to the AC motor, and (ii) a second zero crossing of a waveform of AC current drawn by the AC motor, and determining, based on the time interval, an amount of torque produced by the AC motor during the actuating. The determined amount of torque may be used to verify that the valve is in a closed position.

Also disclosed herein is a valve actuator configured to determine the torque applied to a valve that is coupled to the valve actuator. The valve actuator may include an AC motor to operate the valve, a microcontroller to measure, during operation of the valve, a time interval between: (i) a first zero crossing of a waveform of AC voltage applied to the AC motor, and (ii) a second zero crossing of a waveform of AC current drawn by the AC motor, and a torque measurement component to determine, based on the time interval, an amount of torque produced by the AC motor during the operation of the valve. The torque measurement component may use the determined amount of torque to verify that the valve is in a closed position.

Some examples of downstream uses of the measured torque are also described herein. Some of the downstream uses can help to run diagnostics, prevent damage to components of the valve system, facilitate preventative maintenance for the components of the valve system, and allow the valve system to operate properly within specifications. The techniques and systems disclosed herein also improve the technological process of closing a valve in order to increase the safety for operators and other personnel in the field. For example, accurate torque measurements can be used to verify that the valve is in a fully closed position where the valve member is fully seated within the valve seat. Confirmation of a fluid-tight seal at the valve can prevent potentially hazardous situations from arising. Moreover, the valve actuator of the various embodiments disclosed herein uses a timer embedded in the microcontroller of the valve actuator to digitally determine the amount of torque produced by the AC motor. Accordingly, various examples of a valve actuator disclosed herein can be less complex in design and cheaper to manufacture than previous systems designed to measure torque (e.g., systems with a plurality of strain gauges and extra mechanical and electrical components).

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE SEVERAL VIEWS OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Described herein are techniques and systems for determining, during operation of a valve by an alternating current (AC) motor of a valve actuator, an amount of torque produced by the AC motor. The embodiments disclosed herein are described, by way of example and not limitation, with reference to a valve system that is suitable for use in marine environments, such as on ocean liners, or ships, including military ships and submarines. However, it is to be appreciated that other types of valve systems of varying designs may benefit from the techniques and systems disclosed herein. Furthermore, the exemplary valve system described herein can be implemented within any suitable environment.

As used herein, the term "valve" is broadly construed to include, but is not limited to, a device capable of regulating a flow of one or more substances through one or more passageways by opening, closing, or partially blocking the one or more passageways. For example, a valve can halt or control the flow of a fluid (e.g., a liquid, a gas, a fluidized solid, or mixtures thereof) through a conduit, such as a pipe, a tube, a line, a duct, or another structural component (e.g., a fitting) for conveying substances. Valve types include, without limitation, ball valves, butterfly valves (e.g., concentric, double offset, triple offset, etc.), globe valves, plug valves, and the like.

Example Valve System

Figure 1A:
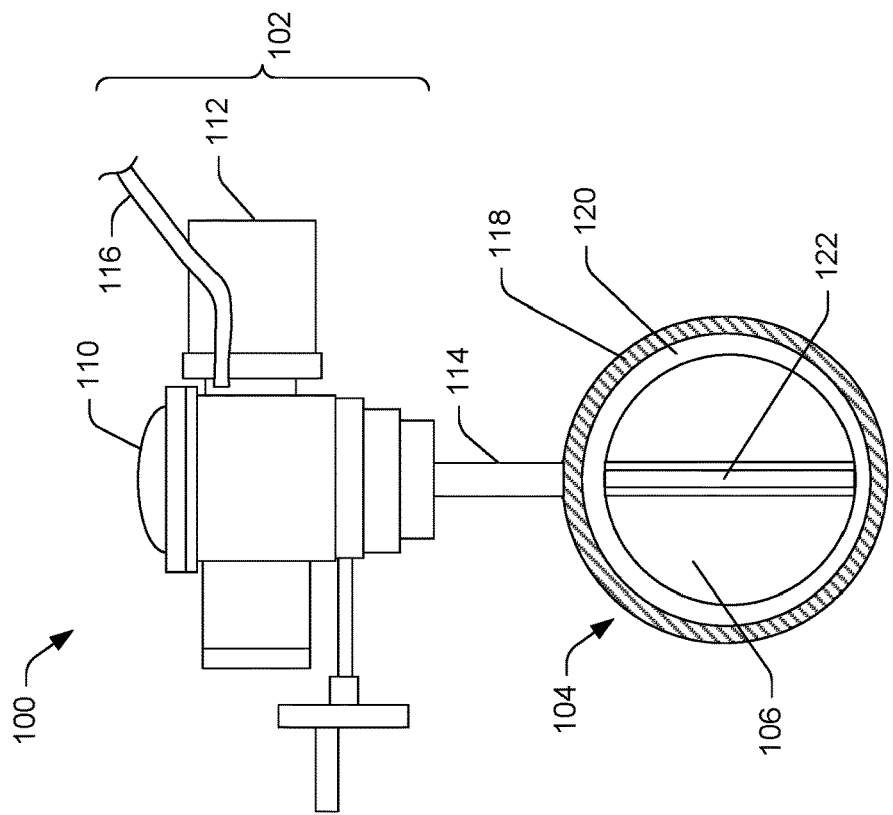
FIG. 1A illustrates a side elevation, and partial cross-sectional, view of an example valve system including a valve actuator coupled to a valve, the valve being in a closed position.
Figure 1B:
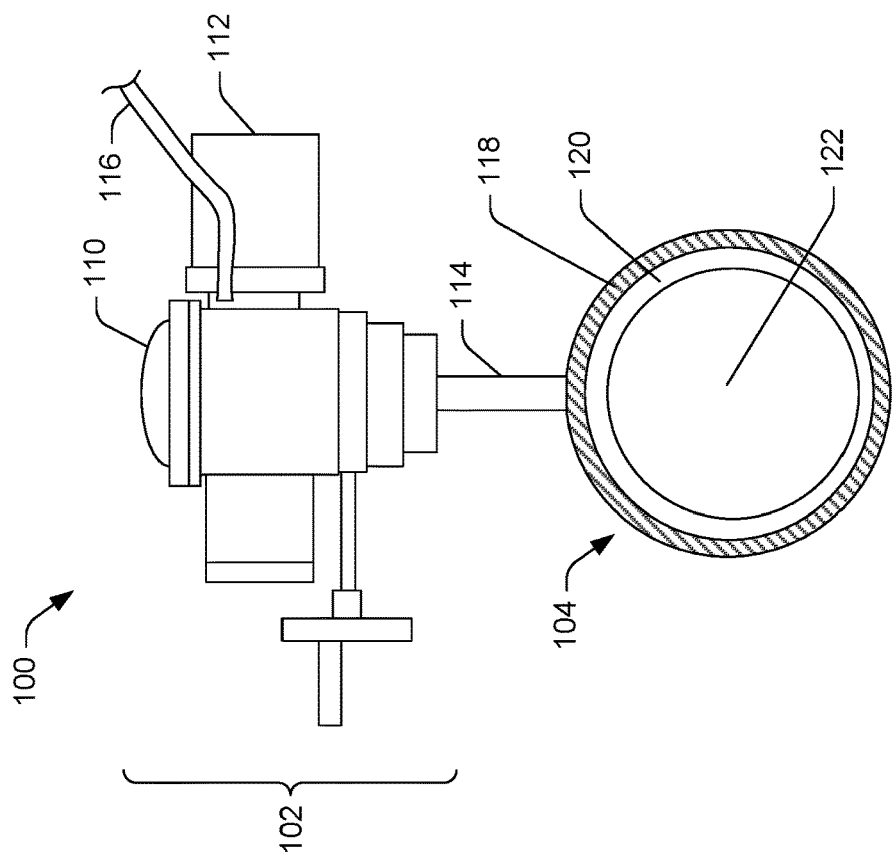
FIG. 1B illustrates a side elevation, and partial cross-sectional, view of an example valve system including a valve actuator coupled to a valve, the valve being in an opened position.

FIGS. 1A and 1B illustrate side elevation, and partial cross-sectional, views of an example valve system 100. The valve system 100 may be associated with a larger system, such as a plant (e.g., a water treatment plant, a power plant, etc.), a refinery, a factory, or a vehicle, such as a watercraft. Furthermore, the valve system 100 may represent one of a plurality of valve systems associated with the larger system. As noted above, the valve system 100 may be implemented in any suitable environment, which may include, without limitation, a non-corrosive environment, a corrosive environment, a magnetic environment, a non-magnetic environment, a moist environment, a marine environment, or combinations thereof. In some embodiments, the valve system 100 may be used in civilian or military watercraft (e.g., ocean liners, floating vessels, boats, ships, submersible vehicles such as submarines, and the like). Marine environments are known to be especially harsh on the materials and the operation of the electrical/mechanical components because of the abundance of moisture and corrosive substances, such as salt water. Such harsh environments may greatly influence the amount of torque required to operate the valve system 100.

The valve system 100 includes a valve actuator 102 coupled to a valve 104. The valve actuator 102 may comprise an assembly of various subcomponents. FIG. 1A illustrates the valve 104 in a closed position. FIG. 1B illustrates the valve 104 in an opened position. The valve 104 may be positioned in a passageway 106 (See FIG. 1B; not shown in FIG. 1A) and may operate between the opened and closed positions to regulate the flow of fluids and like substances through the passageway 106. The valve actuator 102 may utilize various components to automatically control the operation/actuation of the valve 104 in order to open and close the valve 104.

The valve actuator 102 may further include a main body 110 coupled to an electric AC motor 112 (e.g., an AC induction motor). The main body 110 may house internal components (e.g., mechanical and electrical components, such as a gear train, microcontrollers, sensors, and so on). A housing of the main body 110 may protect the internal components from the external environment. The AC motor 112 is configured to convert electrical energy to mechanical force or motion, and may, for example, include a rotor that moves with respect to a stator to generate torque. When energized, the AC motor 112 powers the actuation of the valve 104 by transmitting the output of the AC motor 112 to a drive assembly (not shown) inside the main body 110. The drive assembly may include, without limitation, a gear train, worm gear assembly, spur gears, planetary gears, drive belts, drive shafts, drive chains, clutch plates, and so on, that are configured to work together to transmit the output of the AC motor 112 to a connector 114, and ultimately to the valve 104. That is, the drive assembly in the main body 110 is configured to transmit the force produced by the AC motor 112 to the connector 114 that couples the valve actuator 102 to the valve 104. The connector 114 may rotate about an axis to transmit the force to the valve 104. A power line 116 delivers power from a power source to the AC motor 112 and other electrical components that are provided in the main body 110.

The valve 104 may comprise a valve housing 118, a valve seat 120 that is carried by the valve housing 118, and a valve member 122 that is movable, shown as a generally circular disk, between a closed (FIG. 1A) and an opened (FIG. 1B) position. The subject matter disclosed herein is not limited to a disk valve, and may include other types of valves 104 of different types and geometries including, for example, valves where the action of opening and closing the passageway requires moving a part in a linear fashion rather than rotating a part. For example, the valve 104 may include, without limitation, a gate valve, a globe valve, or another type of "rising stem" valve, which may be operated by driving a threaded nut or similar component that lifts or lowers a threaded shaft as the nut turns. In this scenario, torque is applied to the threaded nut, which, in turn, moves the shaft for operating the valve 104. When in the closed position (FIG. 1A), the valve member 122 is configured to creates a fluid tight seal at the interface between the valve member 122 and the valve seat 120. The valve 104 is considered to be in the closed position when the valve member 122 seats against the valve seat 120 to form a fluid tight seal in the passageway 106 on either side of the valve 104.

Figure 2:
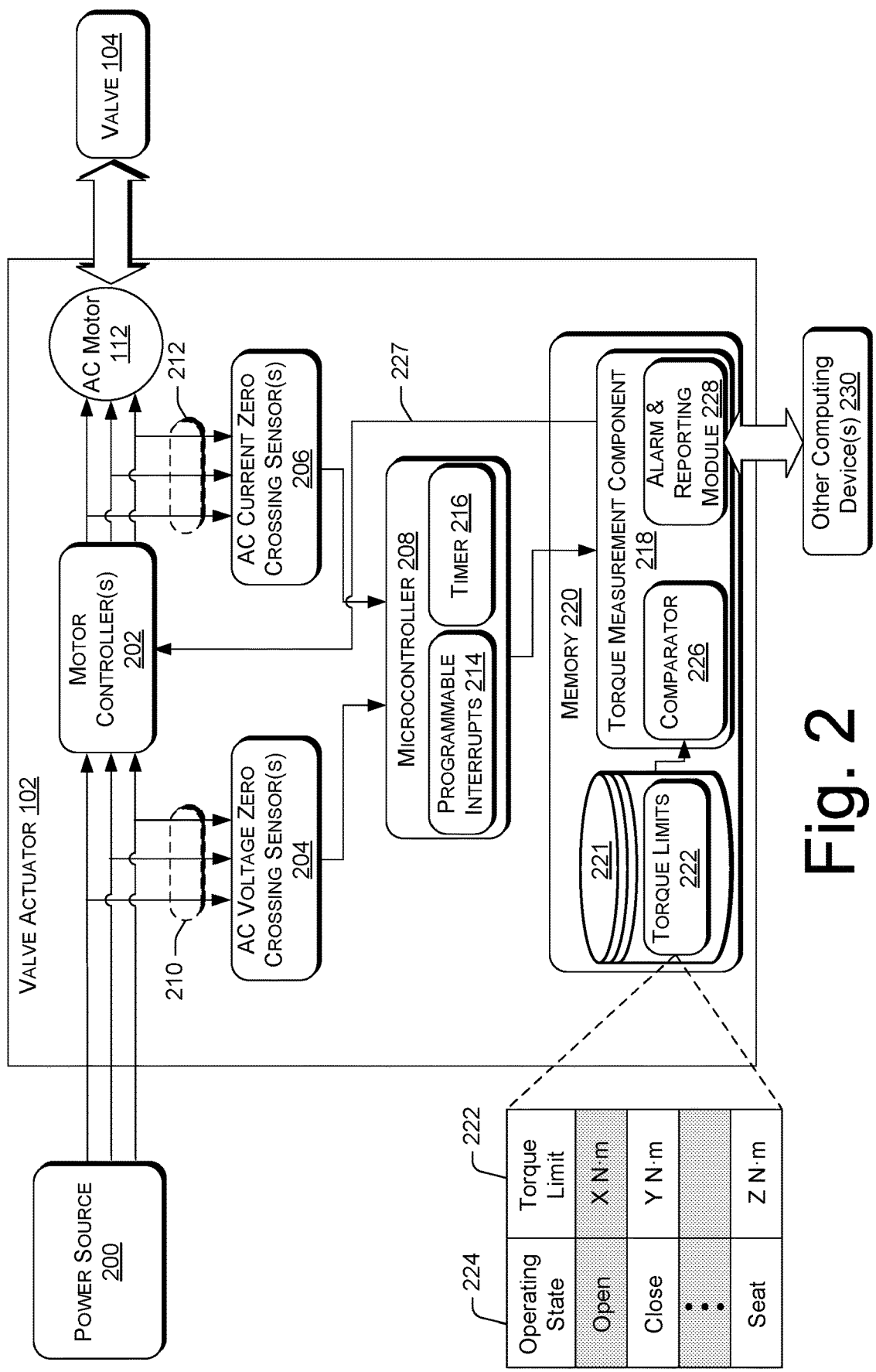
FIG. 2 illustrates a block diagram of an example valve actuator coupled to a power source and a valve.

FIG. 2 illustrates a block diagram of an example valve actuator 102 that is coupled to a power source 200 and a valve, such as the valve 104 of FIGS. 1A and 1B. In some embodiments, the power source 200 may comprise a three-phase (3-phase) voltage source that produces three waveforms that are equal in magnitude, but out of phase to each other by 120 degrees (°). However, any single-phase, two-phase, or poly-phase power source 200 may be utilized herein without changing the basic characteristics of the system. For a power source 200 that is a 3-phase voltage power source, each of the three voltage waveforms may be represented by a sinusoidal wave having a predetermined frequency and magnitude that is substantially equal to the other two waveforms.

FIG. 2 shows the power from the power source 200 being provided to the valve actuator 102. The provisioning of the power to the valve actuator 102 was represented in FIGS. 1A and 1B by the power line 116. In particular, the power from the power source 200 may be provided to one or more motor controllers 202, and ultimately provided to the AC motor 112 of the valve actuator 102. When the power source 200 is a 3-phase power source, the AC motor 112 may comprise a 3-phase load, such as a 3-phase AC induction motor. In this manner, electrical power from the power source 200 may be coupled to the AC motor 112 for energizing the AC motor 112 for use in actuating the valve 104.

The motor controller(s) 202 may be communicatively coupled to the AC motor 112 and programmed to control the AC motor 112 by causing the AC motor 112 to provide varying levels of output power for operating the valve 104 at different levels of torque, and to power the drive assembly in both forward and reverse directions. In some embodiments, the motor controller(s) 202 may be configured, through a calibration process, to operate the AC motor 112 at varying speeds or outputs according to different operating states of the valve 104 that require different amounts of torque. For instance, an amount of torque required to open the valve 104 under normal conditions may be known to the motor controller(s) 202 such that, during the operating state of "opening" the valve 104 from a closed position, the motor controller(s) 202 may control the AC motor 112 to operate at a predetermined speed or output that will result in application of the predetermined torque. Other operating states of the valve 104 (e.g., closing, seating, rotating between open and closed positions, etc.) may require different respective torques. Accordingly, the motor controller(s) 202 can be programmed with a complete torque profile for the associated valve 104 in order to apply an appropriate amount of torque for a particular operating state of the valve 104.

The motor controller(s) 202 may be programmed based on, but not limited to, the configuration of the drive assembly of the valve actuator 102, a predetermined torque profile or multiple specified torques for actuating the valve 104, end of travel positions for the valve 104, and the like. Thus, position settings, force settings, travel limits, or any combination thereof may be used to program or calibrate the motor controller(s) 202 for operating the AC motor 112. The motor controller(s) 202 may include, but is not limited to, one or more central processing units (CPUs), microprocessors, digital signal processors (DSPs), application-specific integrated circuits (ASICs), and so on, and may include on-board or embedded storage, such as volatile memory, non-volatile memory, read-only memory (ROM), random access memory (RAM), and the like.

The valve actuator 102 is configured to electronically determine the amount of torque produced by the AC motor 112. In some examples, the valve actuator 102 may determine torque at any given time during operation of the valve 104. It is recognized that the AC motor 112 is powered from the power source 200 by a substantially constant peak voltage. It is also recognized that the current that is supplied by the power source 200 to the valve actuator 102 can be represented by the phase shift between the voltage AC waveform and the current AC waveform for any given phase of the power source 200, such as a particular phase of a 3-phase power supply. In other words, the phase shift/difference between the waveform of AC voltage applied to the AC motor 112 and the waveform of AC current drawn by the AC motor 112 for each phase of the power source 200 may be dependent on the type or extent of the load provided by the AC motor 112. The current will lag the voltage to a degree that depends on the amount of torque applied to the valve 104. It is to be appreciated that the relative phase shift between each pair of lines (i.e., between each of two phases of a 3-phase power supply) does not change in response to changing torque; the relative phase shift between each pair of lines of the power source 200 will remain at substantially 120° phase shift. However, as the torque applied to the valve 104 increases, the phase shift between the waveform of the AC voltage applied to the AC motor 112 and the waveform of the AC current drawn by the AC motor 112 for a given phase will change proportionally to the change in torque. Thus, the phase shift between the waveform of the AC voltage applied to the AC motor 112 and the waveform of the AC current drawn by the AC motor 112 can be an indicator of the torque produced by the AC motor 112 and applied to the valve 104.

Figure 3:
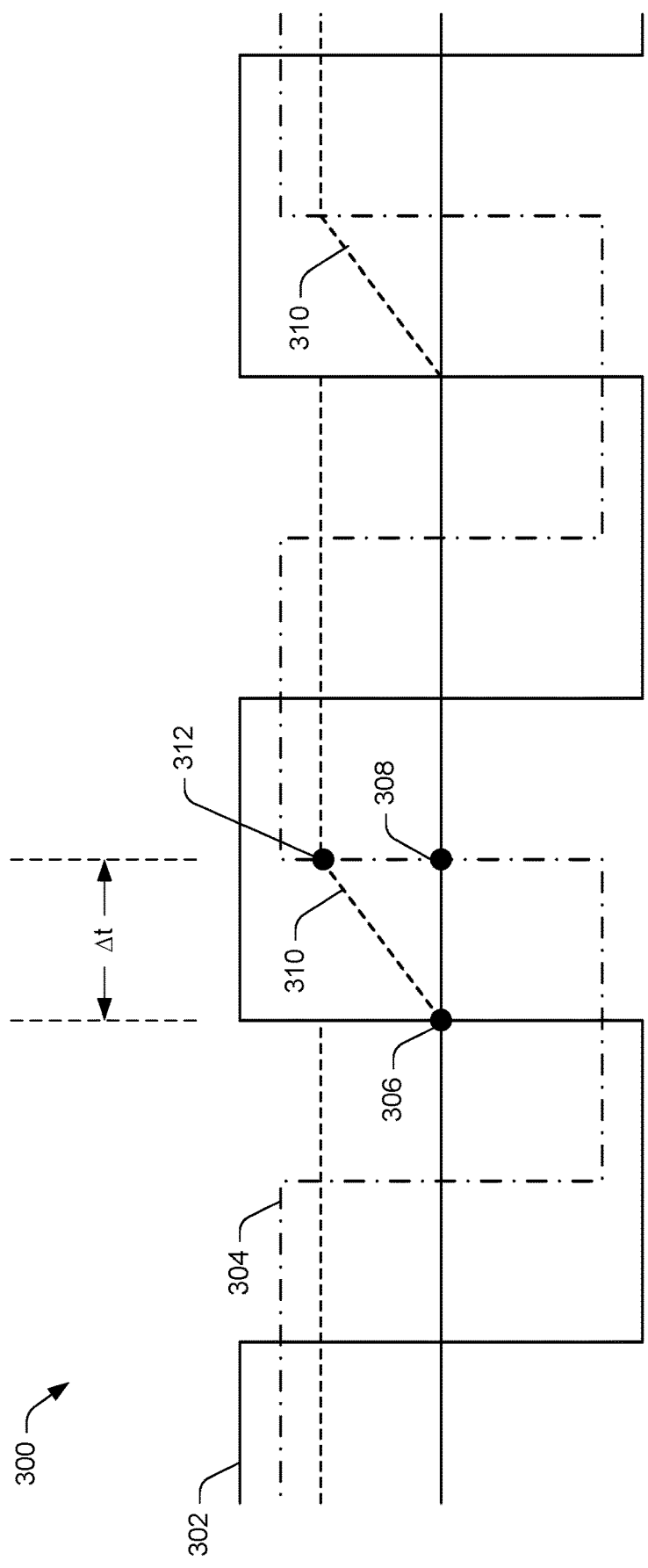
FIG. 3 is a graph of a waveform of AC voltage applied to the AC motor and a waveform of AC current drawn by the AC motor associated with a power source that provides power to a valve actuator, the graph illustrating torque measurement techniques according to various embodiments.

Referring briefly to FIG. 3, a graph 300 shows squared-up versions of a waveform of the AC voltage 302 applied to the AC motor 112 and a waveform of the AC current 304 drawn by the AC motor 112. The waveform of AC voltage 302 applied to the AC motor 112 and the waveform of AC current 304 drawn by the AC motor 112 are associated with the power source 200 that is coupled to the valve actuator 102. For example, the AC waveforms 302 and 304 may correspond to one of the three phases of a 3-phase voltage power source 200. In particular, the graph 300 depicts a phase shift that exists between the waveform of AC voltage 302 applied to the AC motor 112 and the waveform of AC current 304 drawn by the AC motor 112; in this case, the waveform of AC current 304 drawn by the AC motor 112 is lagging the waveform of AC voltage 302 applied to the AC motor 112. The graph 300 also illustrates multiple "zero-crossing" points (or "zero crossings") for each of the AC waveforms 302 and 304, such as a first zero crossing 306 of the waveform of AC voltage 302 applied to the AC motor 112 and a second zero crossing 308 of the waveform of AC current 304 drawn by the AC motor 112.

Returning to FIG. 2, the valve actuator 102 may include one or more AC voltage zero crossing sensors 204 and one or more AC current zero crossing sensors 206. The AC voltage zero crossing sensor(s) 204 may be configured to sense or detect a zero crossing point of at least one waveform of AC voltage 302 applied to the AC motor 112, and, in response, generate a signal that is indicative of the detected zero crossing point. For example, the AC voltage zero crossing sensor(s) 204 may detect the first zero crossing 306 of the waveform of AC voltage 302 applied to the AC motor 112, which may correspond to a particular phase of a 3-phase voltage power source 200. In some embodiments, multiple AC voltage zero crossing sensors 204 may each be used for a particular phase of a two-phase or poly-phase power source 200. For example, three sensors 204 may be provided in the valve actuator 102 such that there is one sensor 204 for each of the three phases of a power supply 200 comprising a 3-phase voltage power supply.

Similarly, the one or more AC current zero crossing sensors 206 may be configured to sense or detect a zero crossing point of at least one waveform of AC current 304 drawn by the AC motor 112, and, in response, generate a signal that is indicative of the detected zero crossing point. For example, the AC current zero crossing sensor(s) 206 may detect the second zero crossing 308 of the waveform of AC current 304 drawn by the AC motor 112, which may correspond to a particular phase of a 3-phase voltage power source 200. In some embodiments, multiple AC current zero crossing sensors 206 may each correspond to a respective phase of a two-phase or poly-phase power source 200. For example, three sensors 206 may be provided in the valve actuator 102 such that there is one sensor 206 for each of the three phases of a 3-phase voltage power supply 200. By using the AC voltage zero crossing sensor(s) 204 and the AC current zero crossing sensor(s) 206, the valve actuator 102 may be able to detect various consecutive zero crossing points and generate signals that are sent to a microcontroller 208 to measure a time interval between the receipt of the sequential zero crossing points on the graph 300, as will be described in more detail below.

In some embodiments, the valve actuator 102 may comprise a convertor 210 and a convertor 212, each configured to convert sinusoidal AC waveforms into square waveforms, such as the square waveform of AC voltage 302 applied to the AC motor 112 and the square waveform of AC current 304 drawn by the AC motor 112 shown in FIG. 3. For instance, the convertors 210 and 212 may comprise an electronic circuit configured to convert high voltage AC sinusoidal waveforms to low voltage square waves. Any suitable technique for converting sinusoidal waveforms to squared-up versions of the waveform may be utilized herein. Using squared-up versions of the AC waveforms allows for straight forward identification of the transition from one digital state to another so that the identified transition can be used as an event for stopping and starting a timer, as will be described in more detail below. In other words, the zero crossing time of the square wave corresponds to the time of the transition from one digital state to another, and the zero crossing time can be directly monitored using square waveforms. In alternative embodiments, the AC sinusoidal waveforms may be processed without converting the waveforms to square waveforms. In this scenario, the zero crossing point may be determined by comparing the AC value to zero, and if the AC value equals zero, an event may be generated for stopping and starting the below-described timer.

In some embodiments, the convertors 210 and 212 may further comprise, at least in part, analog-to-digital (A/D) converters (not shown) to convert analog power input signals to digital power input signals for downstream digital signal processing. In other embodiments, the zero crossing sensors 204 and 206 may themselves be configured to convert analog signals to digital signals through the use of A/D converters embedded in the sensors 204 and 206.

The microcontroller 208 may receive signals from the zero crossing sensors 204 and 206 whenever a zero crossing point is detected in a waveform of AC voltage 302 applied to the AC motor 112 and a waveform of AC current 304 drawn by the AC motor 112, respectively. The signals for the zero crossing point detected for the waveform of AC voltage 302 applied to the AC motor 112 may be received before the zero crossing point signal for the waveform of AC current 304 drawn by the AC motor 112 is received in instances when the waveform of AC current 304 drawn by the AC motor 112 lags the waveform of AC voltage 302 applied to the AC motor 112. The time interval between the receipt of the first zero crossing 306 signal of the waveform of AC voltage 302 applied to the AC motor 112 and the second zero crossing 308 signal of the waveform of AC current 304 drawn by the AC motor 112 is indicative of the phase shift between the two AC waveforms 302 and 304, and hence is indicative of the torque produced by the AC motor 112.

Thus, the microcontroller 208 may include programmable interrupts 214 that interrupt the microcontroller 208 to start a timer 216 (e.g., start a clock, a counter, etc.) upon receipt of a signal from the AC voltage zero crossing sensor(s) 204 that indicates the occurrence of a first zero crossing 306 of the waveform of AC voltage 302 applied to the AC motor 112. The programmable interrupts 214 subsequently interrupt the microcontroller 208 in order to stop the timer 216 (e.g., stop the clock, the counter, etc.) upon receipt of a signal from the AC current zero crossing sensor(s) 206 that indicates the occurrence of the second zero crossing 308 of the waveform of AC current 304 drawn by the AC motor 112. In this manner, the microcontroller 208 is able to measure the time interval ($\Delta t$ shown in FIG. 3) between the first zero crossing 306 of the waveform of AC voltage 302 applied to the AC motor 112 and the second zero crossing 308 of the waveform of AC current 304 drawn by the AC motor 112. In other words, the microcontroller 208 is configured to measure the change in time from the time of the first zero crossing 306 of AC voltage applied to the AC motor 112 and the second zero crossing 308 of AC current drawn by the AC motor 112. In some embodiments, the microcontroller 208 may include, but is not limited to, one or more CPUs, microprocessors, DSPs, ASICs, and so on, and may include on-board or embedded storage, such as volatile memory, non-volatile memory, ROM, RAM, and the like.

The time interval, $\Delta t$, measured by the microcontroller 208 may then be sent to a torque measurement component 218 stored in computer-readable memory 220 of the valve actuator 102. Computer-readable media may include two types of computer-readable media, namely computer storage media and communication media. The memory 220 is an example of computer storage media. Computer storage media may include volatile and non-volatile, removable, and non-removable media implemented in any method or technology for storage of information, such as computer readable instructions, data structures, program modules, or other data. Computer storage media includes, but is not limited to, RAM, ROM, erasable programmable read-only memory (EEPROM), flash memory or other memory technology, compact disc read-only memory (CD-ROM), DVD, or other optical storage, magnetic cassettes, magnetic tape, magnetic disk storage or other magnetic storage devices, or any other non-transmission medium that may be used to store the desired information and which may be accessed by the valve actuator 102. Any such computer storage media may be part of the valve actuator 102. In general, computer storage media may include computer-executable instructions that, when executed by the microcontroller 208, perform various functions and/or operations described herein.

In contrast, communication media embody computer-readable instructions, data structures, program modules, or other data in a modulated data signal, such as a carrier wave, or other transmission mechanism. As defined herein, computer storage media does not include communication media.

The torque measurement component 218 may be configured to determine, based on the time interval $\Delta t$ received from the microcontroller 208, a torque produced by the AC motor 112 and applied to the valve 104 during operation of the valve actuator 102. This determination of the torque may involve converting the time interval $\Delta t$ into a torque value having conventional units, such as Newton-meters (N-m), foot-pounds (ft-lbs), inch-pounds (in-lbs), or the like. In some embodiments, a calibration process may be performed in advance of the real-time torque measurement in order to obtain reference calibration points. An example calibration process will be described in more detail below with reference to FIG. 4. With the availability of reference calibration points (e.g., reference torque values and time intervals) obtained through a calibration process, the torque measurement component 218 may interpolate the torque from a measured time interval $\Delta t$ using the reference calibration points.

In some embodiments, the memory 220 of the valve actuator 102 includes a data store 221 containing torque limits 222 with corresponding operating states 224 of the valve 104. For example, a particular torque limit 222 may be predefined for an "opening" operating state 224 to specify the torque limit 222 for that operating state. The valve actuator 102 may be configured to apply a torque to the valve 104 that does not exceed the associated torque limit 222 while opening the valve 104, so as to prevent damage to components of the valve system 100. The torque limit 222 may be determined by carrying out a calibration procedure or the like that monitors the torque applied to the valve 104 during various operating states of the valve 104. The torque limits 222 may be defined differently for different operating states. For example, a first torque limit 222 may be associated with an "opening" operating state, and a second, different torque limit 222 may be associated with a "closing" operating state, a "seating" operating state, and so on. In this manner, a complete torque profile for the valve 104 may be maintained by the valve actuator 102 that can be used to compare measured torque to the torque limits 222 for the various operating states of the valve 104.

In some embodiments, the torque measurement component 218 includes a comparator 226 that is configured to compare one or more torque measurements to a predetermined torque limit 222 for the operating state in question. Accordingly, the comparator 226 may determine a current operating state of the valve 104 that is associated with the measured time interval, $\Delta t$, such that the comparator 226 may "look-up" the operating state 224 and the associated torque limit 222 to make the comparison between the measured torque and the torque limit 222. This comparison of measured torque to torque limits 222 may allow the valve actuator 102 to decide whether to continue or halt/stop the operation of the valve actuator 102. FIG. 2 shows a feedback loop 227 from the torque measurement component 218 to the motor controller(s) 202 for this purpose. That is, the motor controller(s) 202 may receive a signal or other indication from the torque measurement component 218 that the current torque meets or exceeds the torque limit 222 specified in the memory 220, and in response, the motor controller(s) 202 may stop the AC motor 112 and halt any further actuation of the valve 104 in order to mitigate any possible damage to the valve 104 that may result from applying torque to the valve 104 at a level that exceeds the specified torque limit 222. This scenario may occur when an obstruction inhibits normal operation of the valve 104, causing torque to exceed the specified torque limits 222.

In some embodiments, the torque measurement component 218 may include an alarm and reporting module 228 that is configured to send various alerts, alarms, notifications, and/or reports to one or more other computing devices 230, such as over a network (e.g., the Internet, an intranet, a wired or wireless network, a cellular network, or a combinations thereof), or other type of connection (e.g., peer-to-peer (P2P), direct wireless or wired device-to-device connection, etc.), and so on.

The various communications that may be sent by the alarm and reporting module 228 may be triggered by one or more results of the comparator 226. For instance, if the torque measured by the torque measurement component 218 meets or exceeds a specified torque limit 222 for a given operating state 224, the alarm and reporting module 228 may, in response to such an indication, trigger or transmit an alarm that is sent to the other computing device(s) 230. The alarm may cause a notification to be provided at the other computing device(s) 230 including, without limitation, an audible sound, a light (e.g., a flashing light emitting diode (LED)), a short message service (SMS) text message, an electronic mail (e-mail), a banner notification, toast notification, or any similar notification at the other computing device(s) 230. In this manner, a user of the other computing device(s) 230, such as a maintenance operator of the valve system 100, may receive the notification and may take appropriate remedial action in response, such as dispatching personnel to the valve system 100 to diagnose the problem, sending a ticket to a valve maintenance entity, or sounding an alarm in the larger system where the valve system 100 is implemented. For example, if proper operation of the valve 104 is needed to ensure safety to personnel aboard a vessel, an alarm on the vessel may be sounded in response to the notification sent by the alarm and reporting module 228.

In some embodiments, a number of torque measurements may be made by the torque measurement component 218 at multiple different times (e.g., periodically, at regular or irregular intervals, etc.) for a particular operating state 224. For example, a torque measurement can be made every time the valve 104 is opened. These repeated torque measurements may be individually compared to a predetermined torque limit 222 for purposes of ascertaining whether preventative maintenance is needed on a component of the valve system 100. For instance, if a certain number of the last N torque measurements exceeded the specified torque limit 222 for a given operating state 224 (e.g., 5 of the last 10 torque measurements met or exceeded the torque limit 222), this may be an indication that a component (e.g., the valve seat 120, valve seals, packing, etc.) of the valve system 100 is experiencing wear or deterioration and needs to be replaced in order to extend the operating life of the valve system 100. Accordingly, the alarm and reporting module 228 may be configured to generate and send a report detailing that a valve component may be deteriorating and may be in need of replacement or maintenance. Such a report may be sent to the other computing device(s) 230, such as email accounts of relevant maintenance personnel for the valve system 100.

In another illustrative example, the valve seat 120 may wear over time such that the position for seating the valve member 122 has changed from the original calibrated position for seating the valve member 122 to a different position for seating the valve member 122. In this scenario, a maintenance operator may evaluate the position of the valve member 122 during a "seating" operation and determine that the torque applied to the valve during the "seating" operation is failing to completely seat the valve member 122 (e.g., the valve member 122 stops short of full seating position). The maintenance operator may decide to re-program the motor controller(s) 202 to apply a higher torque during the "seating" operation, causing the valve member 122 to seat properly within the valve seat 120. Thus, the torque that is measured by the torque measurement component 218 can facilitate such a modification by providing reference torque measurements.

Depending on the complexity of the valve 104 the operating states of the valve 104 can have relatively complex torque profiles that require application of precise amounts of torque at particular times or positions of the valve member 122. For example, a triple offset valve may have a relatively complex torque profile for a "seating" operation compared to the relatively less complex concentric butterfly valve. When the valve members 122 of a triple offset valve are seated to the valve seat 120 during a "seating" operation, the torque may initially increase, followed by a decrease in the amount torque as the valve member 122 rotates and/or moves into position, followed by another increase in the amount of torque as the valve member 122 goes through a final cranking motion to seat the valve member 122. If the right amounts of torque are not applied at precise times and/or positions of the valve member 122, the valve member 122 may not seat properly during the "seating" operation, which may cause the valve member 122 to stop short of a complete closing position, undershooting the final position. Monitoring torque using the valve actuator 102 of the embodiments disclosed herein can facilitate application of proper torque to the valve 104 to ensure that valve operations are completed properly (e.g., to verify that the valve member 122 is fully seated within the valve seat 120, indicating that the valve 104 is in the closed position), which can ensure safety of personnel in the field in certain implementations.

Referring again to FIG. 3, the graph 300 shows squared-up versions of a waveform of AC voltage 302 applied to the AC motor 112 and a waveform of AC current 304 drawn by the AC motor 112 to illustrate torque measurement techniques according to various embodiments. As described above, a suitable technique for determining the amount of torque produced by the AC motor 112 is by measuring, via the microcontroller 208, the time interval, Δt, between the first zero crossing 306 of the waveform of AC voltage 302 applied to the AC motor 112 and the second zero crossing 308 of the waveform of AC current 304 drawn by the AC motor 112, which is out-of-phase with the waveform of AC voltage 302 applied to the AC motor 112 (e.g., lagging the waveform of AC voltage 302 applied to the AC motor 112). In some embodiments, measurement of the time interval, Δt, is accomplished by interrupting the microcontroller 208 upon receipt of the first zero crossing 306 signal from the AC voltage zero crossing sensor(s) 204 in order to start the timer 216, and interrupting the microcontroller 208 upon receipt of the second zero crossing 308 signal from the AC current zero crossing sensor(s) 206 in order to stop the timer 216. The resulting time interval, Δt, measured by the timer 216 is indicative of the phase shift between the two AC waveforms 302 and 304, and hence is indicative of the torque produced by the AC motor 112. Accordingly, the measured time interval, Δt, may be sent to the torque measurement component 218 to determine, based on the time interval, Δt, a torque produced by the AC motor 112 and applied to the valve 104 during operation of the valve actuator 102.

Another technique for determining torque produced by the AC motor 112 is illustrated in FIG. 3. Particularly, FIG. 3 shows a voltage signal 310 that can be created by an electronic circuit (e.g., an analog circuit). The voltage signal 310 ramps during the time interval, Δt, shown in FIG. 3. In other words, this artificial voltage signal 310 can be created by an electronic circuit (not shown) in the valve actuator 102, the voltage signal 310 starting at zero voltage, and, upon the first zero crossing point 306 of the waveform of AC voltage 302 applied to the AC motor 112, the electronic circuit starts a steady increase in voltage at a predetermined rate. The electronic circuit may continue to increase the voltage, as shown by the ramping portion of the voltage signal 310, until the point where the waveform of AC current 304 drawn by the AC motor 112 crosses the voltage signal 310 (which coincides with the second zero crossing 308 in FIG. 3), and this point is designated as the measurement point 312 in FIG. 3. The voltage level at the measurement point 312 corresponds to the torque produced by the AC motor 112. The creation of the artificial voltage signal 310 solely for purposes of measuring the voltage to derive torque is expected to cost more than the measurement of the time interval, Δt, using the microcontroller 208 with the embedded timer 216. The voltage technique also uses an additional electronic circuit for creating the artificial voltage signal 310. Nevertheless, the voltage method can be a suitable alternate technique in some implementations.

Example Processes

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 4:
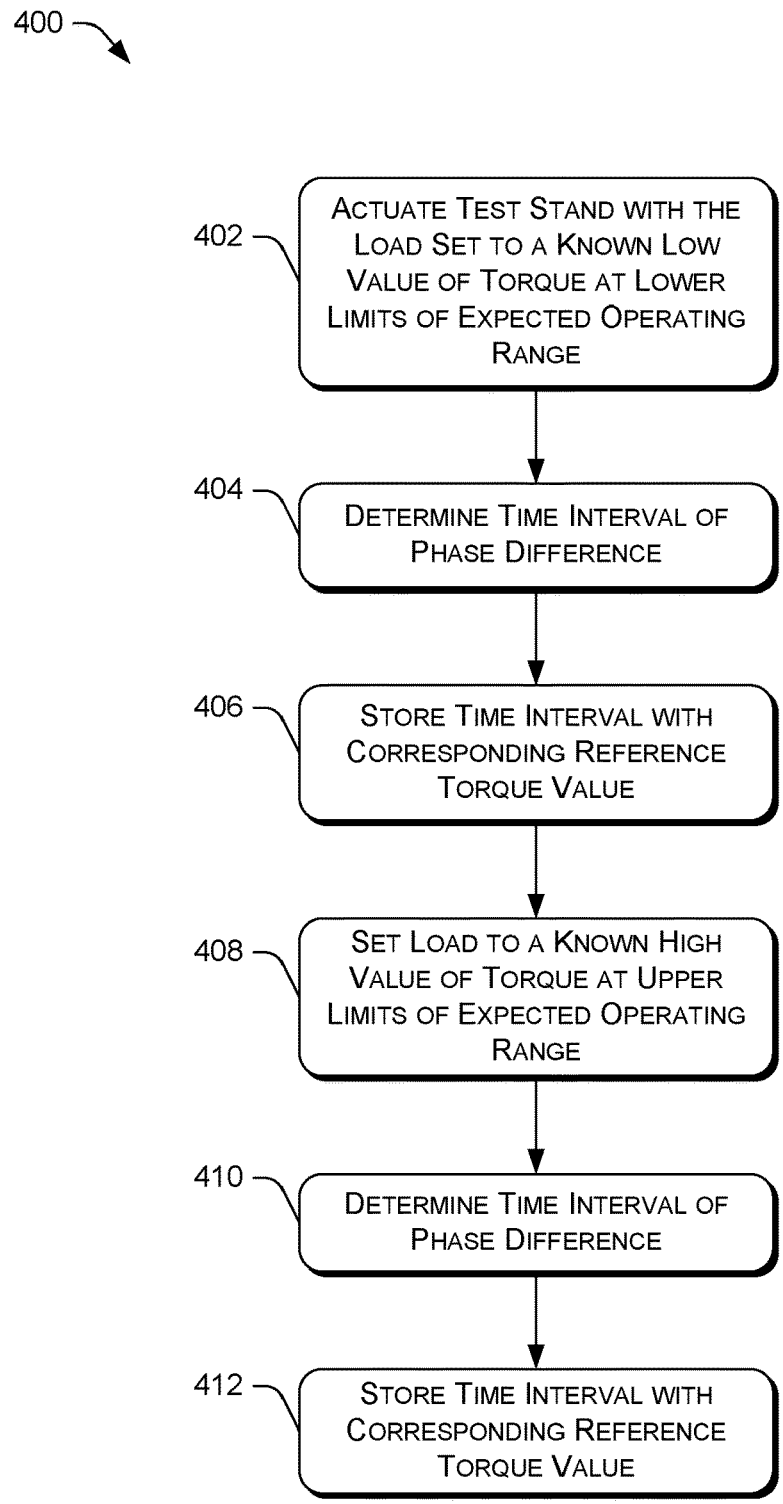
FIG. 4 illustrates a flowchart of an example calibration process for establishing torque calibration values and time intervals that can be later used for real-time torque measurement.

FIG. 4 illustrates a flowchart of an example calibration process 400 for establishing torque calibration values and time intervals that can be later used for real-time torque measurement. The calibration process 400 may be implemented in a system including a valve actuator, such as the valve actuator 102, mounted on a test stand that is configured to simulate a valve, such as the valve 104. Any suitable rotating assembly (e.g., a truck disk brake or the like) may be utilized for the test stand to simulate the valve 104. The test stand may be situated so that the force required to rotate the test stand can be measured. Furthermore, the amount of torque required to operate the test stand may be adjustable so that different time interval measurements may be taken for different amounts of torque applied to the test stand. Moreover, the torque may be measured in any suitable units, such as ft-lbs.

At 402, the valve actuator 102 may actuate the test stand with the load of the test stand set to a first amount of torque, which may be a known low amount of torque. The known low torque amount may be chosen to be an amount of torque at the lower limits of the expected operating range of torque values.

At 404, the time interval of the phase difference, such as the time interval, Δt, shown in FIG. 3, may be measured for the known low torque value. At 406, the measured time interval, Δt, may be stored (e.g., in the data store 221) in association with the corresponding known low torque value. The stored time interval and torque value may be designated as reference calibration values or calibrated points.

At 408, the load of the test stand may be set to a second amount of torque, which may be a known high amount of torque at the upper limits of the expected operating range. At 410, the time interval of the phase difference may be measured for the known high torque value, and at 412, the measured time interval Δt may be stored (e.g., in the data store 221) in association with the corresponding known high torque value. The stored time interval and torque value may be designated as another set of reference calibration values/points.

Although the calibration process 400 describes measuring a time interval for a known low torque value and then repeating the steps for a known high torque value, the process 400 may measure the time interval for the known high torque value before the measurement for the known low torque value. In some cases, there may be mechanical or electrical characteristics that differ when the AC motor 112 of the valve actuator 102 and any associated gearing is operated in different directions (e.g., forward or reverse direction). Accordingly, in some embodiments, independent calibrations may be performed in each direction (e.g., valve opening direction and valve closing direction).

In cases where there is a non-linear relationship between the torque and the phase difference between the waveform of AC voltage 302 applied to the AC motor 112 and the waveform of AC current 304 drawn by the AC motor 112, the calibration process 400 may involve determining intermediate calibration points (i.e., calibration points in between the high and low calibration points). In some embodiments, an interpolation between a plurality of calibration points may be made. In other embodiments, a curve fitting technique may be used with several calibration points along the expected operating range of torque values. The calibration process 400 may be carried out for individual valve actuators 102 and/or AC motors 112. Alternatively, a single calibration process 400 may be performed on a representative valve actuator 102 and/or AC motor 112 that can be leveraged for an inventory of valve actuators 102, assuming that the calibration characteristics are substantially consistent from one AC motor to another and/or from one valve actuator to another.

Figure 5:
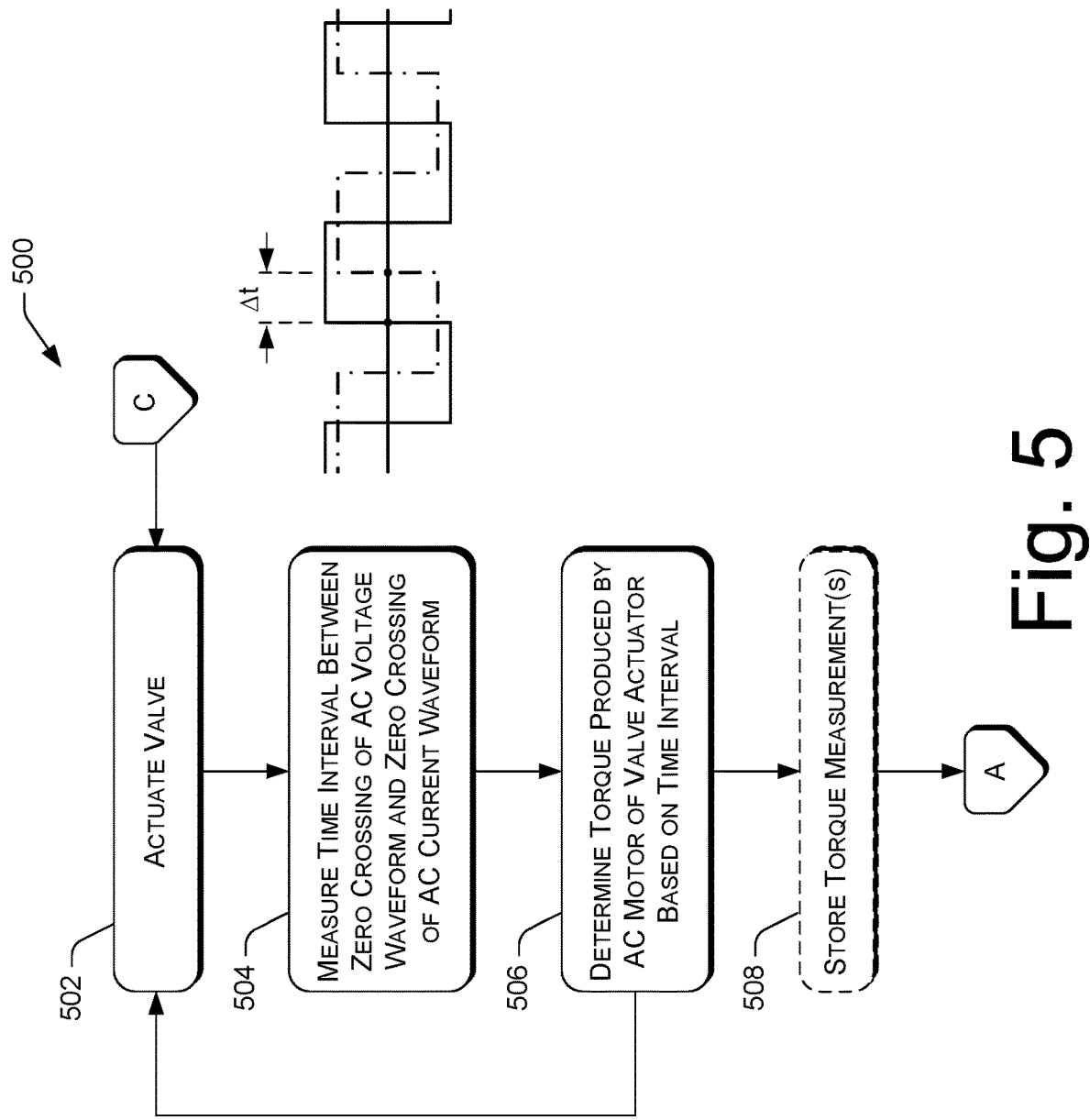
FIG. 5 illustrates a flowchart of an example process of determining, based on a measured time interval, an amount of torque produced by an AC motor of a valve actuator.

FIG. 5 illustrates a flowchart of an example process 500 of determining, based on a measured time interval, an amount of torque produced by an AC motor 112 of a valve actuator 102. The process 500 may be implemented by one or more components of the valve actuator 102, and in particular, the AC motor 112, the microcontroller 208, and the torque measurement component 218.

At 502, the AC motor 112 may actuate the valve 104. The actuation of the valve at 104 may represent valve actuation during any operating state of the valve, such as opening, closing, seating, and so on. In particular, the AC motor 112 output may be transferred to the valve 104 by applying torque to a connector 114 that causes the valve member 122 to move (e.g., rotate, translate, or combinations thereof).

At 504, the microcontroller 208 may measure a time interval, Δt, between a first zero crossing 306 of a waveform of AC voltage 302 applied to the AC motor 112 and a second zero crossing 308 of a waveform of AC current 304 drawn by the AC motor 112, the AC waveforms 302 and 304 being associated with a power source 200 coupled to the valve actuator 102. In some embodiments, the power source 200 comprises a 3-phase power source, and the waveform of AC voltage 302 applied to the AC motor 112 and the waveform of AC current 304 drawn by the AC motor 112 represent the AC waveforms for one of the three phases of the 3-phase power source. In instances where the waveform of AC current 304 drawn by the AC motor 112 lags behind the waveform of AC voltage 302 applied to the AC motor 112, the second zero crossing 308 may comprise the next, sequential zero crossing after the first zero crossing 306 among multiple sequential zero crossings on the graph 300 of FIG. 3. Since the phase shift between the waveform of AC voltage 302 applied to the AC motor 112 and the waveform of AC current 304 drawn by the AC motor 112 is indicative of the amount of torque produced by the AC motor 112, the time interval, Δt, will change with a change in the amount of torque produced by the AC motor 112.

At 506, the torque measurement component 218 determines the amount of torque produced by the AC motor 112 based on the time interval, Δt, measured at 504. This determination of the amount of torque at 506 may involve converting the time interval, Δt, into a torque value having conventional units, such as N-m, ft-lbs, in-lbs, or the like. In some embodiments, the torque measurement component 218 may reference or otherwise access calibration points that were obtained through the calibration process 400 of FIG. 4, and the torque measurement component 218 may interpolate the calibration points from the time interval, Δt, measured at 504 to derive the torque value at 506. When the phase shift of the current for the AC motor 112 is linearly related to the torque, a linear interpolation along a line established by two sets of calibration points (e.g., a high reference torque value and corresponding time interval and a low reference torque value and corresponding time interval) may be sufficient. In some embodiments, interpolation on a calibration curve may be performed when a non-linear relationship exists between the torque and the phase shift of the current for the AC motor 112. The process steps 502-506 may iterate during operation of the valve 104 at any suitable frequency, or upon initiation of a new operating state of the valve 104. In this manner, torque measurement may be repeatedly made for continuous monitoring of torque applied to the valve 104 during various operating states of the valve.

At 508, an optional step of storing the torque measurement determined at 506 may be performed. For example, the torque determined at 506 may be stored in the memory 220 of the valve actuator 102 along with other historical torque measurements. The torque measurements may be maintained in the memory 220 for a period of time and then aged out and deleted, or sent to the other computing device(s) 230 for permanent storage on a remote computing system with perhaps larger memory capacity. In some embodiments, the torque measurements are stored at 508 in association with an operating state of the valve 104 during which the torque was determined. For example, if the actuation of the valve 104 at step 502 involves opening the valve 104 as part of an "opening" operating state, the torque that is determined at 506 may be stored at 508 in association with the "opening" operating state.

In some embodiments, the amount of torque that was determined at 506 may be utilized for various downstream functions. For example, the amount of torque may be used, by the torque measurement component 218, to verify that the valve 104 is in the closed position where the valve member 122 is fully seated within the valve seat 120. This confirmation may involve the comparator 226 comparing the amount of torque determined at 506 to a torque limit 222 in the data store 221. In some cases, the referenced torque limit 222 may be a lower limit that is to be met in order to ensure proper closure of the valve 104. For example, if the amount of torque determined at 506 is less than the referenced torque limit 222 used to ensure full closure of the valve 104, this may indicate that the valve member 122 was not fully seated within the valve seat 120 during a closing operation of the valve 104, and remedial action may be taken in response to such an indication.

Figure 6:
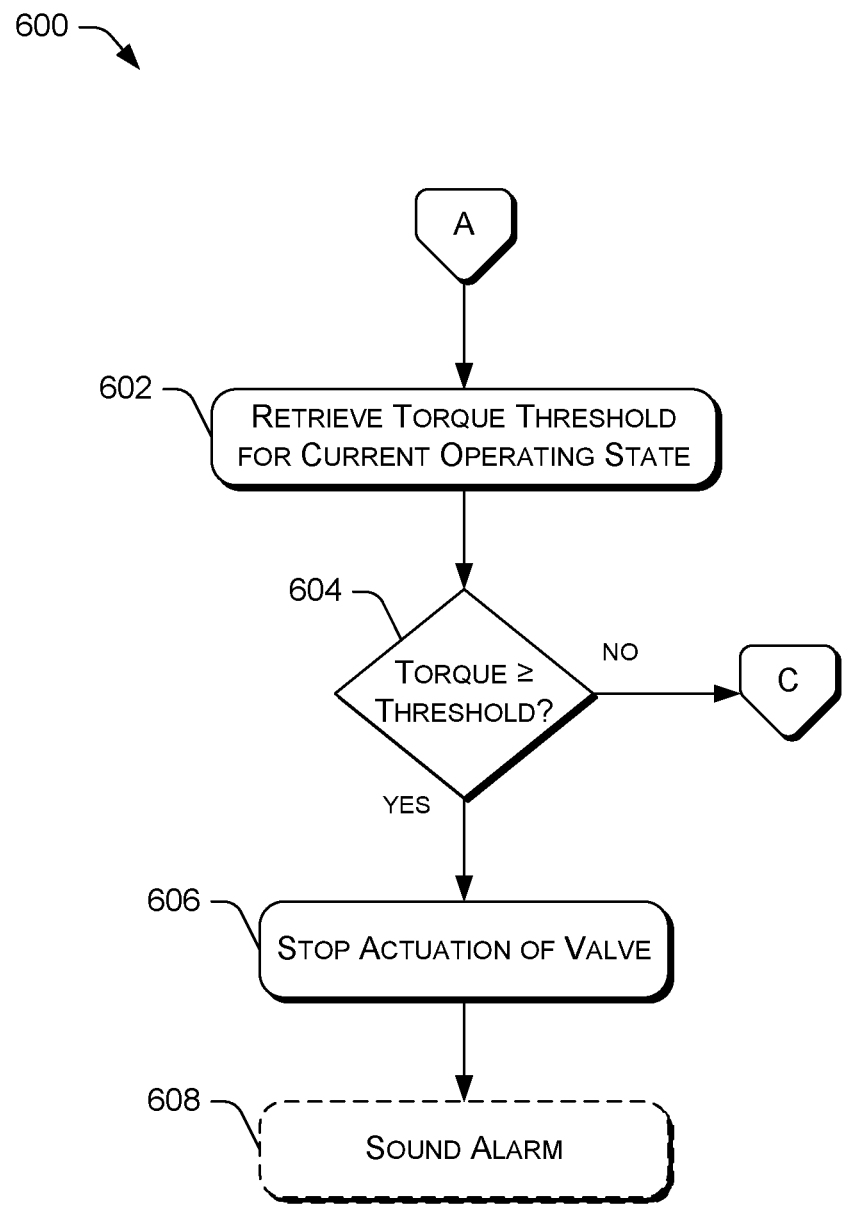
FIG. 6 illustrates a flowchart of an example process of determining whether to stop or continue actuation of a valve based on measured torque produced by an AC motor of a valve actuator.

FIG. 6 illustrates a flowchart of an example process 600 of determining whether to stop or continue actuation of a valve 104 based on measured torque produced by an AC motor 112 of a valve actuator 102. The process 600 may continue from step 508 of the process 500 of FIG. 5, as shown by the off-page reference "A," and the process 600 may be implemented by one or more components of the valve actuator 102, and in particular, the torque measurement component 218 and the motor controller(s) 202.

At 602, the torque measurement component 218 may retrieve, for a current operating state 224 (e.g., opening, closing, seating, etc.) of the valve 104, a torque limit 222 from memory 220 of the valve actuator 102. The torque limit 222 may have been specified as part of a calibration process during initial setup of the valve system 100.

At 604, the comparator 226 of the valve actuator 102 may determine whether the amount of torque determined at step 506 of the process 500 meets or exceeds the torque limit 222 retrieved at 602. If the measured torque is less than the torque limit 222, the valve actuator 102 may continue operation of the valve 104 by following the off-page reference "C" back to the beginning of the process 500 so that other torque measurement can be made during operation of the valve 104 using the process 500.

If, on the other hand, the measured torque meets or exceeds the torque limit 222 at decision block 604, the process 600 may proceed to 606 where the actuation of the valve 104 is halted. For example, the motor controller 202 may receive an indication from the torque measurement component 218 that the torque limit 222 has been met or exceeded, and, in response, the motor controller 202 may stop the operation of the AC motor 112 to refrain from actuating the valve 104 any further. Halting the operation of the valve 104 in this manner may prevent damage to components of the valve system 100 that can be caused by application of excessive torque to the valve 104 that is not needed for normal operation of the valve 104.

In some embodiments, the process 600 may include an optional step 608 of sounding an alarm in response to the determination at 604 that the measured torque meets or exceeds the torque limit 222, and in addition to stopping the actuation of the valve 104 at step 606. For example, an alarm may be issued by the alarm and reporting module 228 of the valve actuator 102 and sent to the other computing device(s) 230 so that a notification may be provided at the other computing device(s) 230 in order to apprise users of the other computing device(s) 230 of the alarm. The users of the other computing device(s) 230 may choose to take remedial action in response to receiving the alarm notification.

Figure 7:
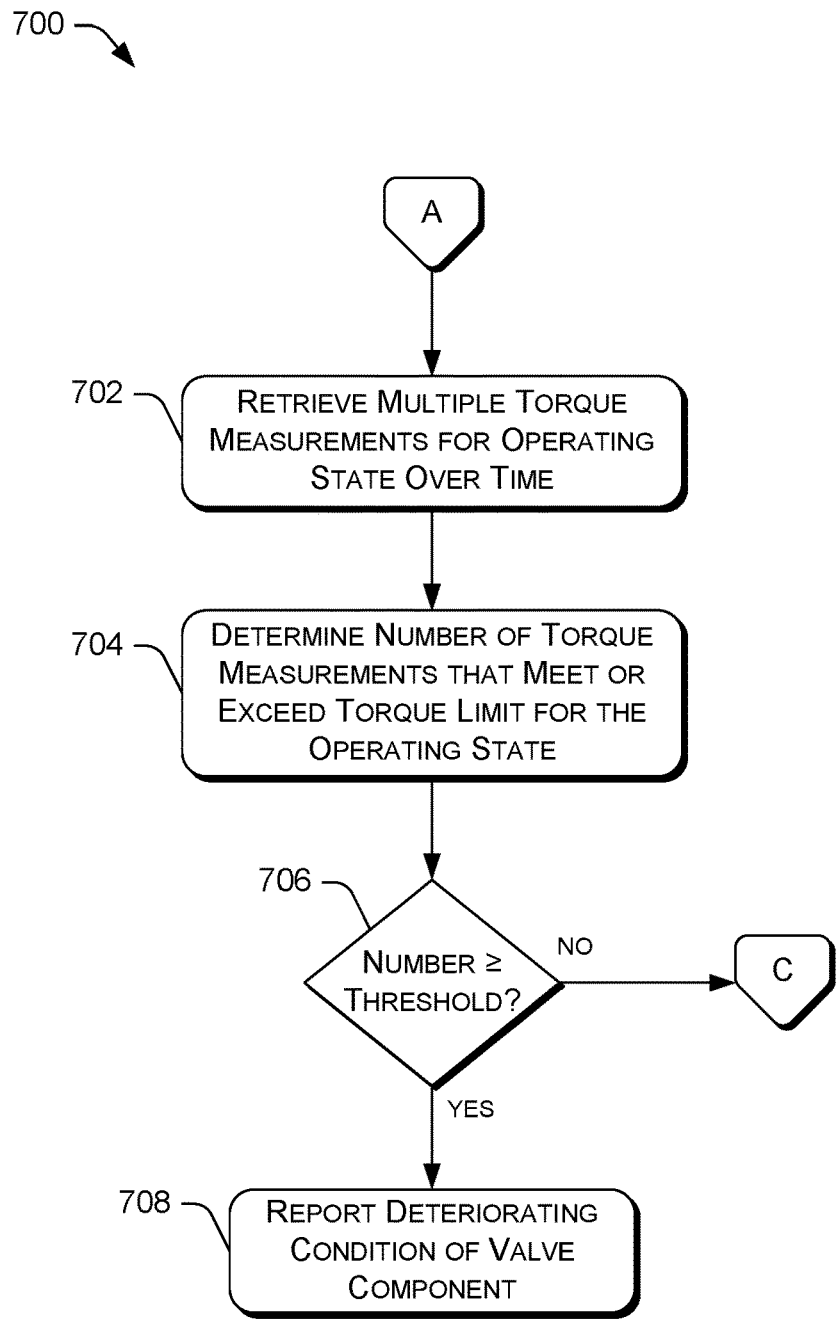
FIG. 7 illustrates a flowchart of an example process of determining whether to generate a preventative maintenance report based on measured torque produced by an AC motor of a valve actuator.

FIG. 7 illustrates a flowchart of an example process 700 of determining whether to generate a preventative maintenance report based on measured torque produced by an AC motor 112 of a valve actuator 102. The process 700 may continue from step 508 of the process 500 of FIG. 5, as shown by the off-page reference "A," and the process 700 may be implemented by one or more components of the valve actuator 102, and in particular, the torque measurement component 218 and the alarm and reporting module 228.

At 702, the torque measurement component 218 may retrieve, for a current operating state 224 (e.g., opening, closing, seating, etc.) of the valve 104, multiple torque measurements from memory 220 of the valve actuator 102. The multiple torque measurements may have been stored at step 508 of the process 500 over time for various instances where a particular operating state 224 was performed by the valve system 100. For example, over a period of time (e.g., the course of a week), the valve system 100 may have opened the valve 104 a number of times, and the amount of torque applied to the valve 104 during those individual opening operations may have been measured and stored using the process 500, and the multiple torque measurements may have been subsequently retrieved at step 702.

At 704, the comparator 226 may compare each of the multiple torque measurements to a torque limit 222 to determine (e.g., count) how many of the multiple torque measurements meet or exceed the retrieved torque limit 222.

At 706, a determination is made as to whether the number of torque measurements determined to have met or exceeded the torque limit 222 meets or exceeds a threshold number of measurements. For example, the threshold number of measurements at 706 may be set at ten measurements such that the threshold is met or exceeded if there are ten or more historical torque measurements that exceed the torque limit 222 based on the determination at 704. If the number of torque measurements that meet or exceed the torque limit 222 is below the threshold number of measurements at 706, the process 700 may proceed, via the off-page reference "C," back to the beginning of the process 500 where the operation of the valve 104 may continue so that more torque measurements may be taken.

If, on the other hand, there is at least a threshold number of torque measurements that exceed the threshold number of measurements at 706, the process 700 may proceed to 708 where the alarm and reporting module 228 generates a report that a component of the valve system 100 may be in a deteriorating condition and in need of preventative maintenance (e.g., replacement, repair, etc.). The report may be sent to the other computing device(s) 230 so that users of the other computing device(s) 230 may be informed of the deteriorating condition so that remedial steps can be taken to maintain the valve system 100 for extended operation. Thus, the process 700 may facilitate preventative maintenance measures to extend the operating life of the valve system 100 through monitoring of torque applied to the valve 104 during operation of the valve 104.

The environment and individual elements described herein may of course include many other logical, programmatic, and physical components, of which those shown in the accompanying figures are merely examples that are related to the discussion herein.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

CONCLUSION

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

The invention claimed is:

1. A method, comprising:
actuating a valve by a valve actuator including an alternating current (AC) motor;
detecting a first zero crossing of a waveform of AC voltage applied to the AC motor;
detecting a second zero crossing of a waveform of AC current drawn by the AC motor;
determining a time interval between the first zero crossing and the second zero crossing;
identifying a reference torque value from a calibration profile including reference time intervals with corresponding reference torque values; and
outputting a torque value corresponding to the time interval based on the reference torque value of the calibration profile.

2. The method of claim 1, further comprising comparing the torque value to a predetermined torque limit associated with an operating state of the valve.

3. The method of claim 2, further comprising:
determining that the torque value is below the predetermined torque limit; and
continuing operation of the valve in response to determining that the torque value is below the predetermined torque limit.

4. The method of claim 2, further comprising:
determining that the torque value meets or exceeds the predetermined torque limit; and
halting operation of the valve in response to determining that the torque value meets or exceeds the predetermined torque limit.

5. The method of claim 1, further comprising:
comparing individual ones of a plurality of torque values to a predetermined torque limit associated with an operating state of the valve, the plurality of torque values including the torque value;
determining that a number of the individual ones of the plurality of torque values meet or exceed the predetermined torque limit, the number exceeding a threshold number of torque values; and
generating a report in response to determining that the number of the individual ones of the plurality of torque values meets or exceeds the predetermined torque limit.

6. The method of claim 1, further comprising verifying that the valve is in a closed position by:
comparing the torque value to a predetermined torque limit; and
determining that the torque value meets or exceeds the predetermined torque limit.

7. A system, comprising:
a valve;
an alternating current (AC) motor that, in operation, operates the valve;
a microcontroller that, in operation:
receives a first signal indicative of a first zero crossing of a waveform of AC voltage applied to the AC motor;
receives a second signal indicative of a second zero crossing of a waveform of AC current drawn by the AC motor;
identifies a time interval between the first zero crossing and the second zero crossing based on the first and second signals;
identifies a reference torque value from a calibration profile; and
outputs a torque value corresponding to the time interval based on the reference torque value of the calibration profile and the time interval.

8. The system of claim 7, wherein:
the microcontroller, in operation, further:
compares the torque value to a predetermined torque limit; and
determines that the torque value is below the predetermined torque limit; and
the system further comprises a motor controller that, in operation, continues the operation of the valve in response to determining that the torque value is below the predetermined torque limit.

9. The system of claim 8, wherein the predetermined torque limit is associated with an operating state of the valve.

10. The system of claim 7, wherein:
the microcontroller, in operation, further:
compares the torque value to a predetermined torque limit; and
determines that the torque value meets or exceeds the predetermined torque limit; and
the system further comprises a motor controller that, in operation, halts the operation of the valve in response to determining that the torque value meets or exceeds the predetermined torque limit.

11. The system of claim 10, wherein the predetermined torque limit is associated with an operating state of the valve.

12. The system of claim 11, wherein the calibration profile is associated with a direction of travel of the valve.

13. The system of claim 11, wherein the calibration profile is associated with an operating state of the valve.

14. The system of claim 7, wherein the microcontroller, in operation, further:
compares individual ones of a plurality of torque values to a predetermined torque limit associated with an operating state of the valve, the plurality of torque values including the torque value;
determines that a number of the individual ones of the plurality of torque values meet or exceed the predetermined torque limit, the number exceeding a threshold number of torque values; and
generates a report in response to determining that the number of the individual ones of the plurality of torque values meets or exceeds the predetermined torque limit.

15. A valve actuator comprising:
an alternating current (AC) motor that, in operation, operates a valve; and
a microcontroller that, in operation:
measures a time interval between: (i) a first zero crossing of a waveform of AC voltage applied to the AC motor, and (ii) a second zero crossing of the waveform of AC voltage applied to the AC motor, the measuring including:
  interrupting, by a first programmable interrupt, the microcontroller in response to the first zero crossing; and
  interrupting, by a second programmable interrupt, the microcontroller in response to the second zero crossing;
compares the time interval to calibration values in a calibration curve, the calibration values including one or more reference time intervals with corresponding reference torque values; and
outputs a first amount of torque produced by the AC motor during the operation of the valve based on the calibration values and the time interval.

16. The valve actuator of claim 15, wherein the microcontroller, in operation, further:
  compares the first amount of torque produced by the AC motor to a predetermined torque limit associated with an operating state of the valve; and
  determines that the first amount of torque produced by the AC motor is below the predetermined torque limit,
  wherein the valve actuator further includes a motor controller that, in operation, continues the operation of the valve in response to determining that the first amount of torque produced by the AC motor is below the predetermined torque limit.

17. The valve actuator of claim 15, wherein the microcontroller, in operation, further:
  compares the first amount of torque produced by the AC motor to a predetermined torque limit associated with an operating state of the valve; and
  determines that the first amount of torque produced by the AC motor meets or exceeds the predetermined torque limit,
  wherein the valve actuator further includes a motor controller that, in operation, halts the operation of the valve in response to determining that the first amount of torque produced by the AC motor meets or exceeds the predetermined torque limit.

18. The valve actuator of claim 15, wherein the microcontroller, in operation, further:
  compares individual ones of a plurality of amounts of torque produced by the AC motor to a predetermined torque limit associated with an operating state of the valve, the plurality of amounts of torque including the first amount of torque;
  determines that a number of the individual ones of the plurality of amounts of torque meet or exceed the predetermined torque limit, the number exceeding a threshold number of measurements; and
  generates a report in response to determining that the number of the individual ones of the plurality of amounts of torque meets or exceeds the predetermined torque limit.

19. The valve actuator of claim 15, wherein the microcontroller, in operation, further verifies that the valve is in a closed position by:
  comparing the first amount of torque produced by the AC motor to a predetermined torque limit; and
  determining that the first amount of torque produced by the AC motor meets or exceeds the predetermined torque limit.

20. The valve actuator of claim 15, wherein the first zero crossing and the second zero crossing are detected by one or more sensors.

* * * * *